United States Patent [19]

Akashi et al.

[11] 4,135,032
[45] Jan. 16, 1979

[54] MAGNETIC RECORDING MEDIUM

[75] Inventors: Goro Akashi; Masaaki Fujiyama; Yasuyuki Yamada, all of Odawara, Japan

[73] Assignee: Fuji Photo Film Co., Ltd., Minami-ashigara, Japan

[21] Appl. No.: 835,376

[22] Filed: Sep. 21, 1977

Related U.S. Application Data

[63] Continuation of Ser. No. 579,163, May 20, 1975, abandoned, which is a continuation-in-part of Ser. No. 559,457, Mar. 18, 1975, abandoned, which is a continuation-in-part of Ser. No. 365,653, May 31, 1973, abandoned.

[30] Foreign Application Priority Data

May 31, 1972 [JP] Japan .................................. 47-54495

[51] Int. Cl.$^2$ .............................................. G11B 5/78
[52] U.S. Cl. .................................. 428/328; 360/134; 427/127; 428/323; 428/330; 428/336; 328/900
[58] Field of Search ............... 428/207, 195, 539, 900, 428/336, 323, 329, 330, 331, 141, 143; 427/127, 256, 128–132, 261, 262, 445, 122; 360/134; 346/135; 252/502, 506, 507, 508, 509

[56] References Cited

U.S. PATENT DOCUMENTS

| 2,591,904 | 4/1952 | Zola | 106/170 |
| 2,804,401 | 8/1957 | Cousino | 428/900 |
| 3,214,286 | 10/1965 | Ramberger | 428/207 |
| 3,293,066 | 12/1966 | Haines | 428/458 |
| 3,617,378 | 11/1971 | Beck | 428/900 |
| 3,655,421 | 4/1972 | Long | 428/207 |
| 3,734,772 | 5/1973 | Schnell et al. | 428/900 |

Primary Examiner—Stanley S. Silverman
Attorney, Agent, or Firm—Sughrue, Rothwell, Mion, Zinn and Macpeak

[57] ABSTRACT

A magnetic recording medium comprising a non-magnetizable plastic film support having a magnetic recording layer on one side thereof and, on the other side thereof, a layer containing (1) at least one powder of carbon black or graphite, and (2) at least one powder of a white pigment or a light colored pigment, and (3) a binder, powders (1) and (2) forming divided color areas in the back surface layer, and the back surface layer having a surface electrical resistance below $1 \times 10^{10}$ ohm/cm$^2$.

10 Claims, 5 Drawing Figures

MAGNETIC RECORDING MEDIUM

CROSS REFERENCE TO RELATED APPLICATIONS

This is a continuation of application Ser. No. 579,163, filed May 20, 1975 now abandoned which is a Continuation-in-Part of Ser. No. 559,457 filed Mar. 18, 1975, now abandoned which was in turn a Continuation application of Ser. No. 365,653, filed May 31, 1973 of the same title now abandoned.

BACKGROUND OF THE INVENTION

1. Field of the Invention

The present invention relates to a magnetic recording medium for use as a video tape, audio tape, memory tape, magnetic recording card, etc.

2. Description of the Art

A magnetic recording medium basically comprises a magnetizable layer provided on one side of a support. When the adherence of the magnetizable layer to the support is poor, the layer has been provided on an undercoated support; and when the magnetic recording layer comprises multiple, laminated layers, a layer having dispersed therein a powdered material having a lubricating property, such as graphite, tungsten sulfide, or molybdenum sulfide, etc., has been provided on the back side of the support opposite the side provided with the magnetizable layer for improving the running of the magnetic recording medium. Further, an electrically conductive layer having dispersed therein fine powder of an electrically conductive substance such as carbon black, graphite, etc., has been provided on the back side of various magnetic recording materials for making the magnetic recording medium antistatic.

Heretofore, a transparent plastic film has been used as the support of magnetic recording media. However, the back surface of such media shows the color of the magnetizable layer (dark brown) through the support and the back surface of a magnetic recording media provided with a gliding layer, electrically conductive layer, etc., is black in color.

Further, a magnetic recording medium, after recording, must be identified by marking on the medium or on its package (case, reel or outer packaging box) because the recording on the magnetic recording medium is not visible.

Various colored tapes have been attached to a magnetic recording medium to identify the recording. However, in the case of putting numerous and various recordings on the same magnetic recording medium, it would be convenient to make it possible to put a mark on the magnetic recording medium directly. This is fact would be preferred in order to produce the same number of markings as the number of the recordings.

Considering the fact that a black or dark colored material, such as a pencil or ink, is generally used for marking, and that black writing on a white background is more easily discerned than white writing on a black background, the back surface of a magnetic recording medium is preferably white to make it possible to use numerous marking materials. For this purpose, a layer having dispersed therein a white or light colored pigment has been provided on the back surface of the support of a magnetic recording medium. However, such a construction for a magnetic recording medium has the defect of being high in electric charge, and since the electrification of a magnetic recording medium tends to cause electrostatic adsorption of dust thereon, the result is a situation extremely unfavorable for recording onto the magnetic recording medium or the regeneration thereof.

SUMMARY OF THE INVENTION

An object of the present invention is to provide a magnetic recording medium easily marked by a black or dark colored marking material, where the marks are easily discriminated, and which is excellent in antistatic effect.

According to the present invention, a magnetic recording medium is provided comprising a magnetizable layer on one side of a support made of a non-magnetizable plastic film and, on the opposite side thereof, a layer containing: (1) at least one powder of carbon black or graphite; and (2) at least one of a white pigment or a light colored pigment, powders (1) and (2) forming divided color areas in the back surface layer.

Figure 1:
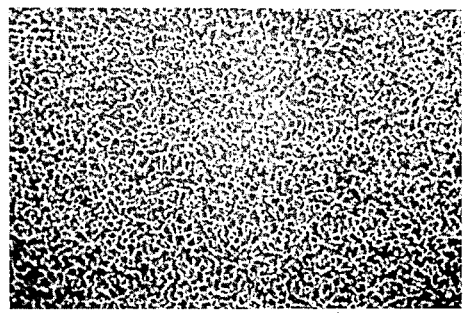
FIGS. 1 - 5 are electron-microscope photographs of back side layers of magnetic recording mediums as are described in the Examples.
Figure 2:
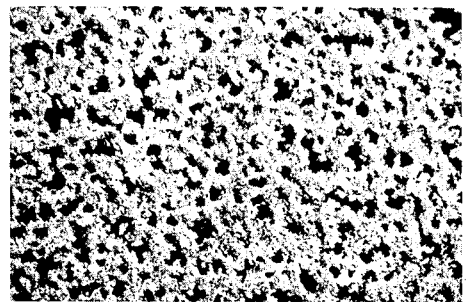
Figure 3:
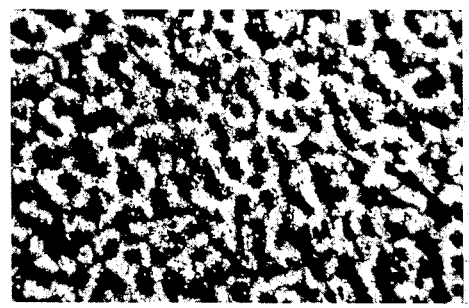
Figure 4:
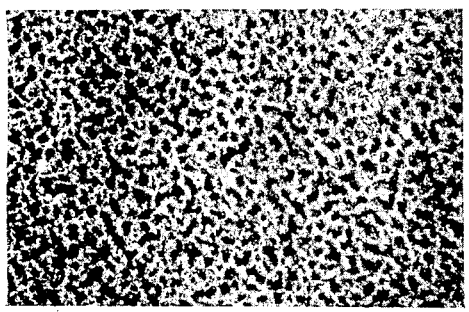
Figure 5:
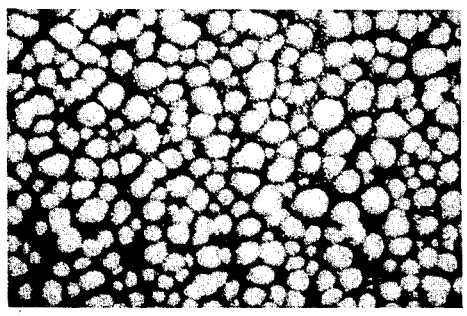

In more detail, FIG. 1 corresponds to Example 1, FIG. 2 corresponds to sample 2 of Example 2 (a comparative example), FIG. 3 corresponds to sample 3 of Example 2, FIG. 4 corresponds to sample 6 of Example 2 and FIG. 5 corresponds to Example 5.

DETAILED DESCRIPTION OF THE INVENTION

The support of the magnetic recording medium in the present invention can be selected from various plastic films as are currently used for such. To be specific, the plastic film suppot can be a material such as polyethylene terephthalate, polyvinyl chloride resin, cellulose acetate, cellulose nitrate, polystyrene, cellulose ether, polyamide resin, polycarbonate resin, etc., and can be film-like, sheet-like, card-like or tape-like. The thickness is not specifically limited. However, when a large amount of recording is required in a small recording area, the total magnetic recording medium is preferably thin (although it may be card-like or tape-like) and a most appropriate support thickness is within the range of 4 to 150$\mu$. Thinner supports tend to be poor in strength and are difficult to handle. Of course, such problems differ in degree according to the form of the magnetic recording medium, and this range is merely illustrative of what appears to be a commercially important type of support.

Many magnetizable layers provided on such a support have hitherto been used, and they may be broadly divided into two classes, one being a type of film comprising a fine powder of a ferromagnetic substance dispersed in a binder and another being a type of ferromagnetic film formed by electrolytic or non-electroless plating or evaporating. Both types have hitherto been publicly known, and many techniques are known for the formation, preparation process, etc., which can be suitably utilized. As will be apparent to one skilled in the art, the present invention thus finds application to any ferromagnetic recording material which has been used by the prior art. For instance, illustrative of such materials are those described in pending U.S. application No. 186,786. The present invention is an improvement thereon, but not limited thereto.

"The opposite surface layer", the most characteristic feature in the present invention, can be explained as follows. The opposite surface layer contains: (1) at least one powder of carbon black or graphite; and (2) at least one of a white pigment or a light colored pigment. Carbon black and graphite are now so well known that they require no further detailed explanation, but it is mandatory in the present invention to incorporate at least one of these powders.

The white or light colored pigment includes white pigments such as lead white, zinc white, lithopone, titanium white, etc., white pigments such as barite powder, precipitated barium sulfate, limestone powder, precipitated calcium carbonate, chalk, aluminum hydroxide, talc powder, kaolin, etc., yellow pigments such as lead yellow, zinc yellow, cadmium yellow, etc. Thus, from the object of the present invention, the color phase of the pigment is preferably white although a light colored phase may be similarly used since it can also be discriminated from the black or a mark. It is to be specifically noted that colors other than the above can be used, for instance, light red pigments such as cadmium red, red iron oxide and the like, light green pigments such as chromium green, Phthalocyanine Green, Pigment Green B, chromium trioxide and the like, and light blue pigments such as ultramarine, Prussian blue, Phthalocyanine Blue B, and like pigments, in addition to mixtures thereof. Any light color pigment can be used in the present invention so long as it exhibits a sufficient color difference from the carbon black or graphite. Thus, it will be clear to one skilled in the art that it is impossible to list all such materials and that, in fact, as the difference in color between the carbon black and/or graphite or the light colored pigment increases the color differention effect of the present invention will be increased.

Although the above discussion has been primarily in terms of single pigment systems, it should be noted that mixtures of various light colored pigments can be used with equal success, as can mixtures of carbon black and graphite. Typical mixture systems can include mixtures of white and yellow pigments, mixtures of white and red pigments, mixtures of white and green pigments and mixtures of white and blue pigments.

The particle size of the white or light colored pigment and the carbon black and/or graphite is not particularly limited. However, carbon black or the graphite for forming the dark areas having an average particle size of from about 0.05 to about 5 microns, preferably 0.01 to 3 microns, in combination with a white or light colored pigment for forming light areas at an average particle size of from about 0.5 to about 10 microns, preferably 0.1 to 3 microns, provides excellent results.

In the present invention, these powdery ingredients are dispersed in a solution of a binder and applied to the opposite surface of the support of the magnetic recording medium. The binder of the present invention merely serves a physical supporting function in the present invention and any natural or synthetic polymer used in the art as a binder can be used with success in the present invention. Generally speaking, the synthetic materials are used because of their greater durability, and these will be preferred in the present invention. As the binder, vinyl chloride-vinyl acetate copolymer, acrylic acid resin, cellulosic resin, epoxy resin, polyamide resin, polyurethane resin, acrylate-acrylonitrile copolymer, acrylate ester resin, polyester resin, vinyl acetate resin and the like may be used alone or as a combination of two or more thereof. These binders have heretofore been known and require no particularly detailed explanation.

An organic solvent capable of dissolving the binder is selected with respect to each binder to prepare a solution by dissolving the binder therein.

The above-described powders are added to the solution in an amount of about 5 to about 200 parts of carbon black and/or graphite, preferably about 10 to about 150 parts by weight of the same, based on 100 parts by weight of the binder. On the other hand, the white or light colored pigment or pigments is/are aded in an amount of about 100 to about 300 parts, more preferably about 150 to about 200 parts by weight, based on 100 parts by weight of the binder.

In order to form the opposite surface layer in the invention wherein powder (1) and powder (2) form divided color areas and whose surface electric resistance is less than $1 \times 10^{10}$ ohm/cm$^2$, the dispersion and mixing of the above-described powders (1) and (2) in the binder solution must be conducted to an insufficient extent, i.e., to prevent complete dispersion of the powders, whereafter the resulting insufficient dispersion is applied to a support.

Such insufficient mixing and dispersion can be attained by increasing the amount of the solvent for binder to thereby reduce the total concentration, leaving the dispersion for a prolonged period of time after mixing and dispersion, adjusting the drying rate or by changing the kind of binder.

The thus prepared coating solution is applied to a support by conventional coating methods, e.g., a gravure roll coating method, a Meyer bar coating method, a doctor blade coating method, a reverse roll coating method, an air knife coating method or the like.

The thickness of the opposite surface layer after drying is about 0.1 to about 10$\mu$, preferably 0.5 – 5$\mu$.

Expanding upon the above concepts, the area ratio of white areas to dark areas should be within the range of 20 to 80% to 80 to 20% (1:4 – 4:1), preferably 30 to 70 to 70 to 30 (3:7 – 7:3). If the white areas are less than 20%, then it is extremely difficult to distinguish the markings, with values much below 20% making it impossible to distinguish markings. On the other hand, if the white area is greater than 80%, then the surface electrical resistance increases to an unacceptable value.

Considering all of the above factors, the white area:-dark area square ratio is preferably 30:70 – 70:30%.

Furthermore, considering the visual acuity of most users of the product of the present invention, generally the average size of any one white area or any one dark area should be within the range of 3 microns$^2$ to 500 microns$^2$, more preferably 5 microns$^2$ to 200 microns$^2$.

For example, when the average size of any one white or dark area is less than 3 microns$^2$, markings will be extremely difficult to distinguish for most users, while on the other hand, when it is greater than 500 microns$^2$, the surface electrical resistance is harmfully affected due to the fact that the layer loses its homogeneous-like characteristics.

Understanding the above factors will permit one skilled in the art to appreciate when a correct degree of dispersion is obtained.

The acceptability of any dispersion is tested by making a small test coating to see if the coating meets the area ratio parameter above and the surface electrical resistance parameter. Assuming that the dispersion does meet these criteria, the dispersion can then easily be used.

On the other hand, if the dispersion does not meet the parameter above, any of the four basic dispersion modifying procedures above can be followed.

For instance, the amount of solvent can be appropriately increased (rarely will a decrease in solvent be necessary) and a small test coating made as above to determine its surface electrical resistance and area ratio. Area ratio is generally determined with a microscope.

On the other hand, one can alternatively permit the dispersion to stand for any reasonable amount of time and form the test coating. Depending upon the results, the standing time is then either increased or decreased until an acceptable dispersion results. Again, of course, the test coating procedure is used.

For instance, using a two liter capacity ball mill, particles of an average size of 15 mm in an amount of 1 liter are introduced into the ball mill, then about 0.8 liter of solvent put thereinto and ball milling conducted at 100 rotations per minute for about 10 - 200 hours, preferably 10 - 100 hours. Following these guidelines, generally an acceptable coating dispersion is achieved.

However, one can also adjust the drying rate. The drying time is generally 1 - 60 seconds. When the drying time is shortened, the size of the areas becomes smaller, while, on the other hand, when the drying time is increased the size of the areas becomes larger. While it is quite often necessary to empirically determine the drying time for a particular system, in view of the relatively narrow range required for acceptable drying this can easily be done by one skilled in the art by conducting a process run and then shortening or increasing drying time depending upon the desired area of the individual white or dark areas obtained.

Turning finally to the binder variation to achieve a proper dispersion, one simply selects another binder which enables a more complete prevention of dispersion to be obtained if too good a dispersion has been achieved, or, alternatively, selects a binder which gives the opposite effect if insufficient dispersion has been achieved.

Considering all of the above factors, it is generally easiest to either increase the amount of solvent or to permit the dispersion to stand for an extended period of time after mixing and dispersion, whereby the particles tend to settle.

As is described above, the magnetic recording medium is excellent in ease of marking by a black or dark color marking material, in ease of mark discrimination and in its antistatic effect.

The present invention will now be illustrated in greater detail by the following non-limiting examples of preferred embodiments of the present invention.

EXAMPLE 1

An amorphous polyester resin solution was applied to both surfaces of a polyethylene terephthalate film $23\mu$ thick in a dry thickness of $0.6\mu$ to form a subbing layer. Thereafter, a coating solution comprising 100 g of needle $\gamma$-$Fe_2O_3$ powder (mean particle size: $0.5\mu \times 0.08\mu \times 0.08\mu$), 40 g of a mixed binder comprising a vinyl chloride-vinyl acetate copolymer (Polymerization degree of about 450) and an epoxy resin of a molecular weight of about 900 (1:1 weight ratio) and an organic solvent was applied thereto and dried to form a magnetic recording layer of $12\mu$ dry thickness. The resulting coated assembly was subjected to the same after-treatments as are normally conducted in the production of video tapes (including calendar processing by a super calendar, cutting to tape form and the like) to thereby produce magnetic recording tapes.

Each of the compositions set forth in Table 1 was charged in a ball mill and dispersed and mixed for about 35 hours to prepare a coating solution for forming an opposite surface layer. Each of the resulting coating solutions was applied to the above-described subbing layer of $0.6\mu$ dry thickness made of an amorphous polyester resin provided on the back side of the magnetic recording tape, then dried to form a back surface layer of $2.0\mu$ thickness.

TABLE 1

| | Coating solution for forming a back surface layer | | | | |
|---|---|---|---|---|---|
| Sample | Carbon black | Zinc oxide | Polyurethane resin | Copolymer resin | Isocyanate |
| 1 | 80 | 0 | 40 | — | 13 |
| 2 | 12 | 200 | 30 | 30 | 16.5 |
| 3 | 80 | 0 | 30 | 10 | 13 |
| 4 | 24 | 194 | 30 | 30 | 16.5 |
| 5 | 48 | 182 | 30 | 30 | 16.5 |
| 6 | 96 | 158 | 30 | 30 | 16.5 |

Notes:
(1) Units are grams.
(2) About 700 g of methyl ethyl ketone was used as the solvent for each coating solution.
(3) The mean particle sizes of the carbon black and the zinc oxide were 0.03 $\mu$ and 0.3$\mu$, respectively.
(4) The copolymer resin was acrylonitrile-butyl acrylate; copolymer the copolymer had a viscosity of 600 poise (30% by wt. copolymer in toluene, 25° C).
(5) The polyurethane resin had a viscosity of 30,000 - 70,000 centipoise (30% polymer by wt., methyl ethyl ketone, 25° C).
(6) The isocyanate had a viscosity of 1,500 centipoise (75% toluene, 25° C).

Hue, surface electric resistance and light transmittance were measured with respect to the back surface layer of each of the thus obtained magnetic recording tapes.

The results obtained are shown in Table 2.

TABLE 2

| Sample No. | Hue (*1) | Surface electric resistance (ohm/cm$^2$) | Light transmittance(*2) |
|---|---|---|---|
| 1 | N 2 | $2 \times 10^4$ | 0 |
| 2 | N 4.5 | $2 \times 10^7$ | 18 |
| 3 | N 2 | $2 \times 10^4$ | 0.5% |
| 4 | N 4.5 | $6.5 \times 10^6$ | 18 |
| 5 | N 4 | $1.7 \times 10^6$ | 15 |
| 6 | N 3.5 | $8 \times 10^5$ | 13 |

Notes:
(1)Expressed in terms of the values according to the JIS color standard lightness scale wherein N 1.5 and N 9.5 mean black and white, respectively.
(2)Light transmittance was measured by means of a tungsten lamp after delaminating the magnetic recording layer (but including subbing layer).

As can be seen from the above results, in sample No. 1 and sample No. 3 which represent conventional antistatic formulations, the light transmittance is as low as 0 - 0.5%, though the surface electric resistance is low. Therefore, even when problems occur during coating, such as a local lack of coating, the position thereof cannot be optically determined after applying the antistatic layer. Furthermore, since the color of the antistatic layer was N 2 in the lightness scale, it was very difficult to detect the position of the marking during the feeding or rewinding of the tape when marking was with a marking pen (trade name: Flo-Master by Esterbrook Pen Co.) for video tapes.

In contrast, the samples of the present invention, in which zinc oxide was added as a white pigment and which had a back surface layer having coplanarly divided color areas, had a suitable low electric resistance, and a light transmittance or 13 - 18%, and unevenness in coating the magnetizable layer (lack of coating)

could be detected through the backing layer, and the lightness of the white antistatic layer thereof was about N 2 to 3.5 (corresponding to bright gray), so that marking with the aforesaid marking pen was detectable.

As described above, samples in accordance with the invention are excellent in marking and transmittance, which excellence can be attributed to the fact that carbon black is dried in a separate form as shown in Photograph 1, resulting in a divided pattern.

In FIG. 1, the black portions are carbon black and the white portions are zinc oxide. The pattern of carbon black is continuous, and hence the electro-conductivity is high and, since the white portions transmit light, the whole appears white and transmits light. In FIG. 1 the black: white area ratio is about 1:1.

EXAMPLE 2

A magnetizable layer for video tape was provided on a polyethylene terephthalate base $23\mu$ thick in the same manner as in Example 1, and each of the following 9 kinds of antistatic layer was applied thereto in a dry thickness of $2.0\mu$ changing the dispersing period. As the composition, sample No. 2 in Example 1 was used. Subbing layers were applied exactly as in Example 1.

FIG. 2 is a photograph of sample 2 where dispersion was so insufficient that carbon black and zinc oxide are present separately from each other.

FIG. 3 is a photograph of sample 5 (and 3, 4, 8 and 9) having a low surface electric resistance wherein carbon black is continuous, though well separated.

FIG. 4 is a photograph of sample No. 6 (and 7) where dispersion is conducted too much. In these samples, carbon black is discontinuous, though well separated. Therefore, the electric resistance was not reduced though the samples appeared gray. Samples 8 and 9 correspond to samples 6 and 7 left for 36 hours after dispersion treatment, respectively. Samples dispersed too much can be provided with a desired surface electric resistance by allowing the dispersed coating solution to stand.

EXAMPLE 3

Each of the following compositions was applied to a video tape opposite the magnetic recording layer side produced under substantially the same conditions as in Example 1 except for varying the composition of the backing layer (the numbers following the materials are the amount thereof, in grams).

| Sample No. | Electroconductive powder | White powder | Polyurethane resin | Acrylonitrile-butyl acrylate copolymer | Isocyanate |
|---|---|---|---|---|---|
| 1 | Carbon black 12 | Titanium dioxide 200 | 30 | 30 | 16.5 |
| 2 | Carbon black 12 | Zinc oxide 200 | 30 | 30 | 16.5 |
| 3 | Graphite* 12 | Zinc oxide 200 | 30 | 30 | 16.5 |

*Mean particle size of graphite: 1 micron; the carbon black and zinc oxide were identical to those used in Example 1; the titanium dioxide had an average particle size of 0.2 microns.

| Sample No. | Period of ball milling | Surface electric resistance (ohm/cm$^2$) | Hue | Transmittance | Probability of detecting flaws* |
|---|---|---|---|---|---|
| 1 | 0 hr | $5.1 \times 10^{12}$ | N 5.0 | 20% | 2.1 |
| 2 | 5 hr | $4.7 \times 10^{11}$ | N 4.5 | 20 | 1.8 |
| 3 | 10 hr | $8 \times 10^7$ | N 4.5 | 19 | 1.0 |
| 4 | 20 hr | $5.3 \times 10^7$ | N 4.5 | 19 | 1.0 |
| 5 | 40 hr | $4 \times 10^7$ | N 4.5 | 18 | 1.0 |
| 6 | 80 hr | $9 \times 10^9$ | N 4.5 | 18 | 1.2 |
| 7 | 160 hr | $2 \times 10^{10}$ | N 4.5 | 17 | 1.5 |
| 8 | 80 hr | $7.6 \times 10^7$ | N 4.5 | 19 | 1.0 |
| 9 | 160 hr | $1.2 \times 10^8$ | N 4.5 | 19 | 1.1 |

*Comparison of flaws formed after using 500 times in VTR for use in broadcasting, VR-1000 C.

The results were as tabulated above, from which it can be seen that the separation of zinc oxide from carbon black and the formation of a divided pattern can be achieved by adjusting the degree of dispersion. As is easily seen, samples 1 and 2 are bad in that the electrical resistivity is more than $10^{10}$ohm/cm$^2$.

The results are as tabulated below, from which it can be seen that zinc oxide and graphite can be used as the white pigment and electroconductivity-imparting agent, respectively.

| Tested sample No. | Electric resistance on the back surface (ohm/cm$^2$) | Hue | Light transmittance |
|---|---|---|---|
| 1 | $2 \times 10$ | N 4.3 | 18% |
| 2 | $1.7 \times 10$ | N 4.5 | 15% |
| 3 | $7.5 \times 10$ | N 5.0 | 20% |

EXAMPLE 4

Video tapes were produced under the same conditions as in Example 2, and each of the following light colored electroconductive layers was provided on the back side thereof in a dry thickness of $2.0\mu$ (the numbers are the weight of the material, in grams).

| Tested sample No. | carbon black | zinc oxide | Polyurethane resin | Acrylonitrile butyl acrylate copolymer | Isocyanate | Dye* |
|---|---|---|---|---|---|---|
| 1 | 12 | 200 | 30 | 30 | 16.5 | Yellow 101 (solvent yellow 34) |
| 2 | " | " | " | " | " | Pink OP (C.I. No. 45170B) |
| 3 | " | " | " | " | " | Blue 603 (C.I. No. 42595B) |
| 4 | " | " | " | " | " | Violet 701 (C.I. No. 42535) |

*Trade name: Oil Color, all added in an a mount of 0.8 g

The carbon black had an average particle size of 0.035 microns and the zinc oxide had an average particle size of 0.3 microns.

As a result, every opposite surface layer showed a surface electric resistance of about $4 \times 10^7$ (ohm/cm$^2$), a lightness of about N 4.5 and light transmittance of about 15%. Additionally, since the samples of this example were light colored as compared with the aforesaid examples, they are preferred from the viewpoint of commercial value. It was also found that when more than 3%, based on zinc oxide, of dyes were added, the color became darker and, at the same time, light transmittance lowered.

The materials used in this example were the same as those used in Example 1, unless specifically indicated to be different.

EXAMPLE 5

A magnetic recording tape was prepared in the same manner as in Example 1 except that the back side thereof, after being coated with the subbing layer, was coated with a back surface layer provided thereon by applying thereto a coating solution having the following composition instead of those used in Example 1.

| | |
|---|---|
| Zinc sulfide (average particle size 0.4 microns) | 300 g |
| Vinyl chloride-vinyl acetate copolymer | 33 g |
| Epoxy resin | 27 g |
| Polyamide resin | 36 g |
| Carbon black (same as in Example 1) | 20 g |
| Oleic acid | 6.3 g |
| Solvent (mixed solvent of xylene, methyl isobutyl ketone and butanol, mixing ratio being 1:1:1 by weight) | 850 g |
| Period of ball milling treatment | 48 hrs. |

In this example, the vinyl chloride/vinyl acetate copolymer had a molecular weight of 450, the epoxy resin had a molecular weight of 2,000 to 6,000.

A microscopic photograph of the back surface layer thus obtained is shown as FIG. 5. As is clear from FIG. 5, a separated but continuous carbon black layer was observed in the back surface layer. As a result, the surface electric resistance, lightness and light transmittance were $2.5 \times 10^5$ ohm/cm$^2$, N 6.5 and 23%, respectively. Thus, excellent capabilities were confirmed.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetizable plastic film support having a magnetic recording layer on one side thereof and, on the other side thereof, a layer containing (1) at least one powder selected from the group consisting of carbon black and graphite, and (2) at least one powder composed of a light colored pigment, and (3) a binder, powders (1) and (2) forming coplanarly divided continuous dark color areas and discontinuous light color areas in the layer containing same, said layer being a back surface layer and having a dry thickness ranging from about .1 to about 10 microns and being obtained from an organic solvent dispersion by agitating said organic solvent dispersion for 10 to 200 hours at 100 rotations per minute before coating onto said plastic film support:

the dark color areas being so colored due to the presence of the at least one powder selected from the group consisting of carbon black and graphite and the light color areas being so colored due to the presence of the light colored pigment;

the dark color area/light color area ratio being from 80/20 to 20/80%, by square ratio;

each divided color area covering a 3 to 500 sq. micron area; and the back surface layer having a surface electrical resistance below $1 \times 10^{10}$ ohm/cm$^2$ where said back surface layer has been formed by coating on said support a single coating solution which is a dispersion of said powders in a solution of said binder in an organic solution and drying.

2. A magnetic recording medium as claimed in claim 1, wherein said carbon black and graphite powder is from 0.01 to 5 microns of average particle size.

3. A magnetic recording medium as claimed in claim 1, wherein said light colored pigment powder is from 0.05 to 10 microns of average particle size.

4. A magnetic recording medium as claimed in claim 1, wherein said dark colored areas contain a pigment selected from the group consisting of carbon black and graphite and said light colored areas contain a member selected from the group consisting of light colored pigments, incompletely dispersed in said color areas.

5. A magnetic recording medium as claimed in claim 1, wherein the light colored pigments are selected from the group consisting of white pigments, mixtures of white and yellow pigments, mixtures of white and red pigments, mixtures of white and green pigments and mixtures of white and blue pigments.

6. A magnetic recording medium as claimed in claim 5, wherein said white pigment is selected from the group consisting of lead white, zinc white, lithopone, titanium white, barite powder, precipitated barium sulfate, limestone powder, precipitated calcium carbonate, chalk, aluminum hydroxide, talc and kaolin.

7. A magnetic recording medium as claimed in claim 5, wherein said yellow pigment is selected from the group consisting of lead yellow, zinc yellow and cadmium yellow.

8. A magnetic recording medium as claimed in claim 5, wherein said red pigment is selected from the group consisting of cadmium red and red iron oxide.

9. A magentic recording medium as claimed in claim 5, wherein said green pigment is selected from the group consisting of chromium green, Phthalocyanine green, Pigment Green B and chromium trioxide.

10. A magnetic recording medium as claimed in claim 5, wherein said blue pigment is selected from the group consisting of ultramarine, Prussian Blue and Phthalocyanine Blue.

* * * * *

UNITED STATES PATENT AND TRADEMARK OFFICE
CERTIFICATE OF CORRECTION

PATENT NO. : 4,135,032
DATED : January 16, 1979
INVENTOR(S) : Goro AKASHI et al

It is certified that error appears in the above-identified patent and that said Letters Patent are hereby corrected as shown below:

IN THE HEADING:

Related U.S. Application Data:

delete "continuation-in-part of Ser. No. 365,653, May 31, 1973, abandoned."

and insert -- continuation of Ser. No. 365,653, May 31, 1973, abandoned --

*Signed and Sealed this*

*Twenty-fourth* Day of *April 1979*

[SEAL]

Attest:

RUTH C. MASON
*Attesting Officer*

DONALD W. BANNER
*Commissioner of Patents and Trademarks*